April 23, 1957 G. A. KELLER 2,790,023
ANTI-STATIC AIRCRAFT ANTENNA ASSEMBLY
Filed March 10, 1951
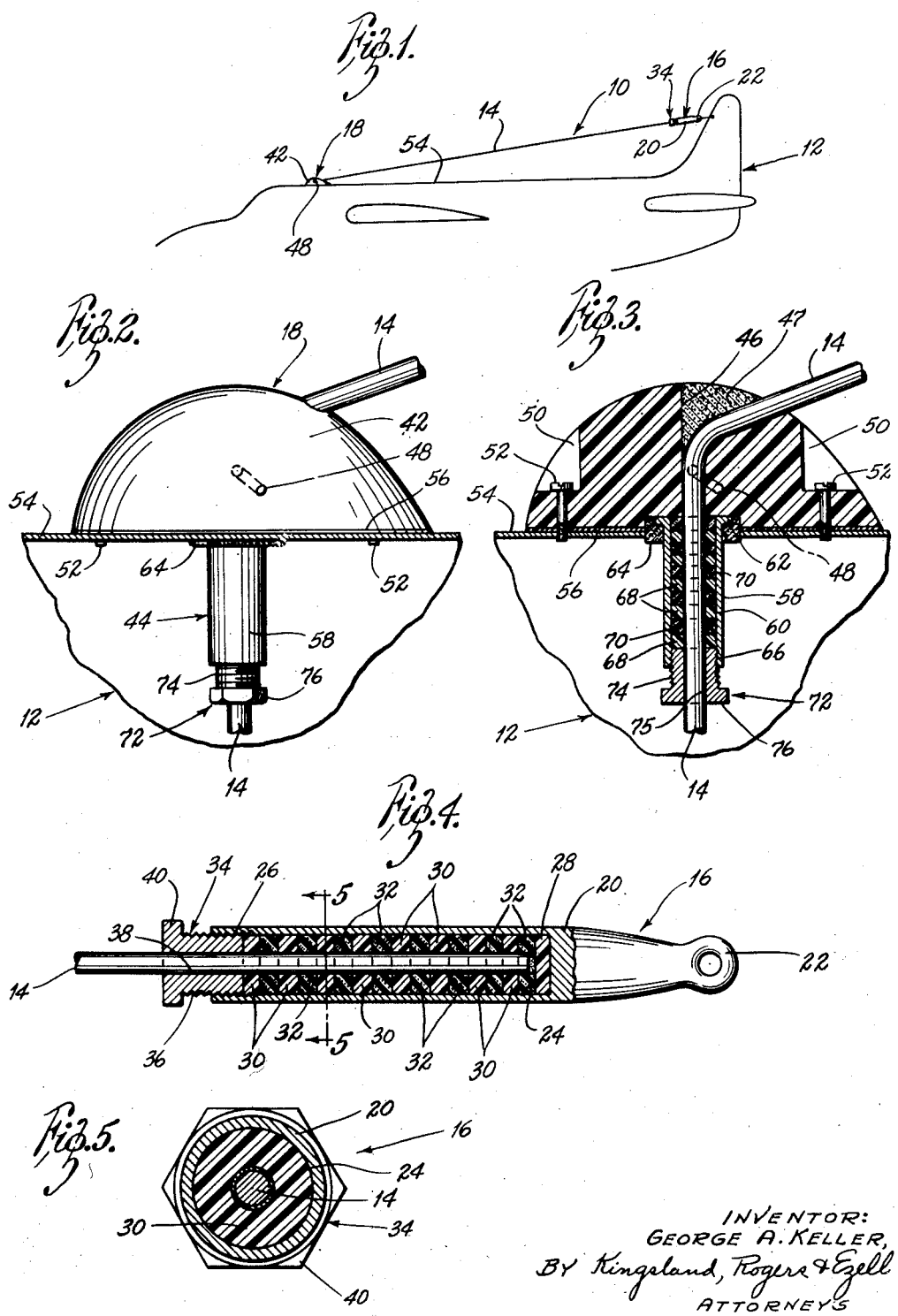
INVENTOR:
GEORGE A. KELLER,
BY Kingsland, Rogers & Ezell
ATTORNEYS 2,790,023
Patented Apr. 23, 1957

2,790,023
ANTI-STATIC AIRCRAFT ANTENNA ASSEMBLY
George A. Keller, Mountain View, Calif.

Application March 10, 1951, Serial No. 214,873

3 Claims. (Cl. 174—40)

The present invention relates generally to the communication art, and more particularly to a novel anti-static aircraft antenna assembly.

At the present time, aircraft antennae are usually made of a stranded conductor which is coated with a polyethylene plastic or the like, to reduce static. In order to seal the ends of the conductor from the atmosphere so as to reduce the static, the ends are usually taped with a polyethylene plastic tape. This has been found not to be completely satisfactory, however, because the tape often cracks or slips and exposes the ends of the conductor to the atmosphere and moisture, thereby materially reducing the anti-static qualities of the installation.

It is an object of the present invention, therefore, to provide a novel anti-static aircraft antenna assembly which includes means for effectively sealing the ends of the conductor from the atmosphere. More particularly, it is an object to provide an antenna assembly which includes means which support the antenna conductor and seal its ends from moisture.

Another object is to provide a novel anti-static aircraft antenna assembly which includes supporting means whereby the antenna conductor can be easily and quickly installed and removed by relatively inexperienced personnel.

Another object of the present invention is to provide a novel anti-static aircraft antenna assembly whereby the tension of the antenna conductor can be adjusted at will within relatively wide limits without cutting or otherwise mutilating the antenna conductor.

Another object is to provide a novel anti-static aircraft antenna assembly which includes a conductor which is unitary and which extends from outside the aircraft to within the aircraft to a position adjacent the equipment to which it is connected.

In one form, the assembly includes a conductor, a tension insulator for fastening the free end of the conductor to the fuselage of the aircraft (preferably the tail assembly), and an entry insulator adjacent the cabin to receive the other end of the conductor which extends to adjacent the equipment within the aircraft. The tension insulator contains a plurality of washers, some of which are of resilient material such as rubber, and which slidably receive the free end of the conductor. Means are provided for compressing the washers to cause the resilient ones to expand inwardly and grip the conductor so as to maintain it in position and seal its end from the atmosphere. The entry insulator is in two parts and includes a roughly hemispherical shaped insulator member fastened to the outside of the fuselage and containing a passageway therethrough to receive the conductor, and a sleeve disposed adjacent the inner end of the passage and which is somewhat similar in construction to the tension insulator in that it contains resilient washers and means for compressing the washers to cause them to grip the conductor.

Although the device is particularly adapted for use with aircraft, it is to be understood that it is not so limited and can be used in ships, etc.

Fig. 1 is a side elevational view of an anti-static aircraft antenna assembly constructed in accordance with the teachings of the present invention, a portion of the aircraft to which it is attached being shown in outline;

Fig. 2 is an enlarged side elevational view of the entry insulator, a portion of the aircraft fuselage being shown in cross section;

Fig. 3 is a diametrical vertical sectional view of the entry insulator taken on a plane which passes through the conductor;

Fig. 4 is an enlarged elevational view of the tension insulator, the insulator being shown partially in longitudinal cross section to better illustrate its construction; and Fig. 5 is a further enlarged transverse sectional view taken on the line 5—5 in Fig. 4.

Referring to the drawings more particularly by reference numerals, 10 indicates generally an anti-static aircraft antenna assembly embodying the teachings of the present invention, shown installed on an aircraft 12.

The assembly 10 comprises a conductor 14 which is preferably stranded and coated with a polyethylene plastic or like material to minimize the static, a tension insulator 16, and an entry insulator 18. As shown in Fig. 1, the tension insulator 16 is fastened to the upper portion of the tail assembly of the aircraft 12 and the entry insulator 18 is positioned above the cabin.

The tension insulator 16 (Figs. 4 and 5) includes an elongated cylindrical housing 20 having an eye 22 adjacent one end for fastening the device to the tail assembly, and an elongated cylindrical cavity 24 in the other end. The mouth of the cavity 24 contains internal threads 26. A flat disc 28 of plastic or like material is disposed within the cavity 24 against its rear wall. Also disposed within the cavity 24 are a plurality of washers 30 of plastic or like material, and a plurality of washers 32 of rubber or like material. The washers 30 and 32 are alternated so that each rubber washer 32 has a plastic washer 30 on each side of it. The openings at the centers of the washers 30 and 32 are of a size to slidably receive the conductor 14.

Disposed in the mouth of the cavity 24, in engagement with the threaded portion 26, is a compression member 34 which contains external threads 36 adjacent its inner end, and a longitudinally extending passageway 38 at its center of a size to slidably receive the conductor 14. The compression member 34 contains a flange portion 40 adjacent its outer end which is hexagonal in shape to receive a wrench for adjusting the position of the compression member 34 relative to the housing 20.

In use, the free end of the conductor 14 is inserted through the passageway 38 in the compression member 34 and through the openings in the washers 30 and 32, to adjacent the disc 28. The compression member 34 is then threaded into the cavity 24 so as to compress the rubber washers 32 between the plastic washers 30. The outer peripheries of the rubber washers 32 are contained between the wall of the cavity 24 so that when they are compressed, they expand inwardly so as to bind on the conductor 14 and fasten it securely within the housing 20. In addition to holding the conductor 14 within the housing 20, the rubber washers 32 also serve to effectively seal off the end of the conductor from the moisture in the atmosphere.

The entry insulator 18 (Figs. 2 and 3) is in two parts and includes a guide member 42 and a securing and sealing member 44. It is to be understood that these could be cast together as a unit without departing from the spirit of the present invention.

The guide member 42 is made of plastic or like material and is generally half ellipsoid in shape to minimize wind resistances. An entry opening 46 is provided in the guide member 42 and converges inwardly, the opening being slot-shaped at the outer surface of the member 42 and circular at the inner surface thereof. As shown in Fig. 3, the rear wall of the slotted portion of the entry opening 46 is curved to reduce the stress in that portion of the conductor 14 which bears on it. The slot is normally sealed with a mastic 47 to prevent water from accumulating in it and freezing. However, it is to be understood that the opening 46 can also be formed so as to be of circular cross section throughout its entire length, thereby obviating the use of the mastic. Drain passages 48 are formed on each side of the guide member 42 and extend rearwardly and downwardly from the opening 46. These drain off any moisture which might accumulate in the entry opening 46. Recesses 50 are provided in the front and rear portions of the guide member 42 to receive machine screws 52 for fastening it to the skin 54 of the aircraft. A gasket 56 is provided between the guide member 42 and the skin 54.

The securing and sealing member 44 includes an elongated tubular housing 58 which has a passageway 60 therethrough and which is disposed adjacent the inner surface of the guide member 42 in alignment with the inner end of the opening 46. The housing 58 contains a flange portion 62 at one end and is fastened to the guide member 42 and the aircraft skin 54 by means of cement 64. The inner end of the passageway 60 contains internal threads 66. Washers 68 which are of plastic or like material, and washers 70 which are of rubber or like material are alternately disposed within the passageway 60. The openings in the washers 68 and 70 are of a size to slidably receive the conductor 14. A cylindrical compression member 72 having external threads 74 is threadedly disposed in the inner end of the housing 58. The compression member 72 contains a longitudinally extending passageway 75 of a size to slidably receive the conductor 14. A hexagonal shaped flange portion 76 is provided adjacent the free end of the compression member 72 to receive a wrench for adjusting the position of the compression member 72 relative to the housing 58.

The operation of the securing and sealing member 44 is similar to the operation of the tension insulator 16 previously described, in that inward movement of the compression member 72 causes the plastic washers 68 to compress the rubber washers 70 and secure the conductor 14 within the member 44 and, at the same time, seal it against the entry of moisture.

Thus, it is apparent that there has been provided a novel anti-static aircraft antenna assembly which fulfills all of the objects and advantages sought therefor.

A single continuous length of antenna conductor can be used which extends from the tail assembly directly to the equipment within the aircraft. Also, the antenna conductor can be easily and quickly installed and removed, and the tension thereof can be easily and quickly adjusted at will by merely unloosening one of the compression members and sliding the conductor in either direction. For example, the tension of the conductor 14 can be adjusted from within the aircraft by unloosening the compression member 72 and adjusting the position of the portion of the conductor 14 which is disposed in the securing and sealing member 44. Furthermore, the rubber washers 32 in the tension insulator 16 securely seal the free end of the conductor 14 from the moisture in the atmosphere so as to maintain the antenna substantially free from static.

It is to be understood that the foregoing description and the accompanying drawings have been given only by way of illustration and example, and that changes and alterations in the present disclosure which will be readily apparent to one skilled in the art are contemplated as within the scope of the present invention which is limited only by the claims which follow.

What is claimed is:

1. For use with a housing, an antenna insulator member of convex shape, means for fastening the insulator member to the outer surface of the housing, said insulator member containing an opening therethrough of a size to slidably receive an antenna conductor and insulate it from said housing; a drain opening extending from the opening through the insulator to the outer surface thereof; an antenna conductor retaining member disposable on the interior of and insulated from the housing adjacent one end of the opening in association with the insulator member and containing a passageway of uniform cross section therethrough in communication with said opening; a plurality of washer-like members disposed in the passageway in juxtaposition and containing openings to slidably receive the conductor, some of said members being rigid and others being of resilient material; and means for compressing the washer-like members longitudinally to cause the resilient members to expand inwardly and grip the conductor.

2. For use with a housing, an insulator member of roughly hemispherical shape, means for fastening the insulator member to the outer surface of the housing, said insulator containing a passageway of a size to slidably receive an antenna conductor extending through the insulator to the housing and insulate the antenna conductor from said housing, said passageway having an antenna conductor receiving surface which is curved at an intermediate section; a sleeve-like member disposable on the interior of and insulated from the housing adjacent to and substantially normal to the inner surface of the insulator member in alignment with the inner end of the passageway therethrough; a plurality of washer-like members disposed within the sleeve-like member in juxtaposition and containing openings to slidably receive the antenna conductor, some of said members being of resilient material; and a compression member threadedly disposed in the end of the sleeve-like member opposite to the insulator for compressing the washer-like members longitudinally to cause the resilient members to expand inwardly and grip the conductor.

3. An antenna assembly for use on an aircraft fuselage, said assembly having an elongated conductor having one end thereof adapted to be disposed outside the fuselage; a first insulator member adapted to releasably connect said one end of the conductor to a portion of the fuselage in insulated relation, the insulator member comprising a housing having an opening therein of a size to receive the end of the conductor; a second insulator member adapted to be fastened to the fuselage and containing an opening therethrough of a size to slidably receive the other end of the conductor, said other end of the conductor extending through the second insulator member and adapted to extend into the interior of the aircraft; both of said insulator members having clamping means comprising a plurality of washer-like members disposed within the opening in juxtaposition and containing openings of a size to slidably receive the conductor, some of said washer-like members being rigid and others being of resilient material; means for compressing the washer-like members so as to deform the resilient members and cause them to grip the conductor; and a disc-like member in said first insulator disposed beneath said washer-like members adapted to serve as a stop means for said conductor end.

References Cited in the file of this patent

UNITED STATES PATENTS

| 276,415 | Hurlbut | Apr. 24, 1883 |
| 1,490,203 | Brown | Apr. 15, 1924 |
| 1,617,989 | Curtright | Feb. 15, 1927 |
| 2,082,566 | Berndt | June 1, 1937 |
| 2,177,508 | Abbott | Oct. 24, 1939 |
| 2,434,658 | Katz | Jan. 20, 1948 |
| 2,446,186 | Meier | Aug. 3, 1948 |
| 2,511,513 | Rempt et al. | June 13, 1950 |
| 2,583,540 | Bennett | Jan. 29, 1952 |
| 2,626,353 | McGee | Jan. 20, 1953 |

FOREIGN PATENTS

| 656,426 | Great Britain | Aug. 22, 1951 |